United States Patent [19]

Suzuki

[11] 4,206,640
[45] Jun. 10, 1980

[54] MAGNETIC FLOWMETER

[75] Inventor: Kazuie Suzuki, Tokyo, Japan

[73] Assignee: Hokushin Electric Works, Ltd., Tokyo, Japan

[21] Appl. No.: 901,095

[22] Filed: Apr. 28, 1978

[51] Int. Cl.² .............................................. G01F 1/60
[52] U.S. Cl. .............................................. 73/194 EM
[58] Field of Search ................................... 73/194 EM

[56] References Cited
U.S. PATENT DOCUMENTS

4,117,721  10/1978  Suzuki et al. ................... 73/194 EM

Primary Examiner—Charles A. Ruehl
Attorney, Agent, or Firm—Michael Ebert

[57] ABSTRACT

A magnetic flowmeter whose electromagnet is excited by a low-frequency excitation current that is derived from an on-off alternating current whose frequency is higher than that of a commercial power line source, the on-off current being modulated by a low-frequency wave. A reference voltage-detecting transformer is interposed between the excitation coil of the electromagnet and an excitation current source. The primary of the transformer is constituted by a pair of windings wherein the excitation current is caused to flow in one direction in the first primary winding and a current produced by the counter-electromotive force generated in the excitation coil in every on-off transient of the excitation current is caused to flow in the opposite direction in the second primary winding. A reference-voltage a-c signal changing in both positive and negative directions is derived from the secondary winding of the reference transformer, whereby a reference voltage having a waveform similar to that of the excitation current actually flowing in the excitation coil is obtained by rectifying the reference-voltge a-c signal, thereby avoiding saturation of the transformer core resulting from a d-c component included in the excitation current.

7 Claims, 18 Drawing Figures

MAGNETIC FLOWMETER

BACKGROUND OF INVENTION

This invention relates generally to magnetic flowmeters, and more particularly to a reference-voltage detecting circuit in a magnetic flowmeter whose electromagnet is excited by a low-frequency excitation current.

In a magnetic flowmeter, an electromagnetic field is established therein by an electromagnet having an excitation coil, the field being intercepted by a fluid passing through the flow tube to induce a flow rate signal in a pair of diametrically-opposed electrodes. Magnetic flowmeters are known which make use of a low-frequency excitation current, such as one whose excitation frequency is well below that of the commercial power-line frequency. One can, by means of a low-frequency excitation type magnetic flowmeter, obtain a flow rate signal having an excellent signal-to-noise ratio; for unwanted magnetic coupling and/or electrostatic coupling between the excitation coil and the signal lead wires connected to the flow tube electrodes may be reduced considerably.

In order to eliminate unwanted fluctuations from the flow rate signal yielded by a low-frequency excitation type magnetic flowmeter, which result from fluctuations in the excitation current for the electromagnet, the general practice is to provide a reference voltage-detecting circuit. This circuit is arranged to produce a reference voltage proportional to the excitation current, the ratio of this reference voltage to the flow rate signal being determined by means of a converter or divider.

To produce the reference voltage, it is known to interpose a resistor in the excitation circuit, the voltage drop across the resistor being proportional to the excitation current and therefore reflecting fluctuations in this current. The use of a resistor for this purpose has a number of disadvantages. For example, though it is desirable that the resistor have a low ohmic value in order to minimize the heat generated therein by reason of IR drop, in using a resistor of small value, the resultant reference voltage has a low level which requires amplification and adds to the cost and size of the instrument.

To overcome this drawback one could, in place of a resistor, make use of a current transformer in the excitation circuit to produce the required reference voltage. But since the frequency of the excitation current flowing through the transformer primary is very low, precise reference voltage detection cannot be effected by means of an ordinary current transformer of small size, and it becomes necessary, therefore, to employ a costly current transformer of very large size.

SUMMARY OF INVENTION

In view of the foregoing, the main object of this invention is to provide an improved reference voltage-detecting circuit for a magnetic flowmeter whose excitation coil is excited by a low-frequency excitation current.

More particularly, it is an object of this invention to provide a reference voltage-detecting circuit which makes use of a current transformer interposed between the excitation current source and the excitation coil, the arrangement being such as to produce a reference voltage having a waveform identical to that of the excitation current without distortion despite saturation of the transformer core.

Briefly stated, in a magnetic flowmeter in accordance with the invention, a low-frequency excitation current is derived from an on-off alternating current whose on-off rate is high compared to the frequency of a commercial power line source, the on-off current being modulated by a low-frequency wave (i.e., a few Hz).

A current transformer serving to detect a reference voltage is interposed between the excitation coil of the magnetic flowmeter and the excitation current source. The primary of the transformer is constituted by a pair of primary windings in an arrangement wherein the excitation current is caused to flow in one direction in the first primary winding and a current produced by the counter electromotive force induced in the excitation coil in every on-off transient of the excitation current is caused to flow in the opposite direction in the second primary winding. A reference voltage a-c signal changing in both positive and negative directions is obtained from a secondary winding of the transformer. By "full-wave" rectifying this reference voltage a-c signal, a reference voltage which has a waveform similar to that of the excitation current is obtained. This reference voltage as well as the signal obtained from the flowmeter electrodes is applied to a divider to yield an output signal which is proportional to flow rate and is independent of fluctuations in the excitation current.

OUTLINE OF DRAWINGS

For a better understanding of the invention as well as other objects and further features thereof, reference is made to the following detailed description to be read in conjunction with the accompanying drawings, wherein:

FIGS. 5A to E are waveforms illustrating the operation of the switch-driving circuit shown in FIG. 4;

DESCRIPTION OF INVENTION

Conventional Reference Voltage Detection

Figure 1:
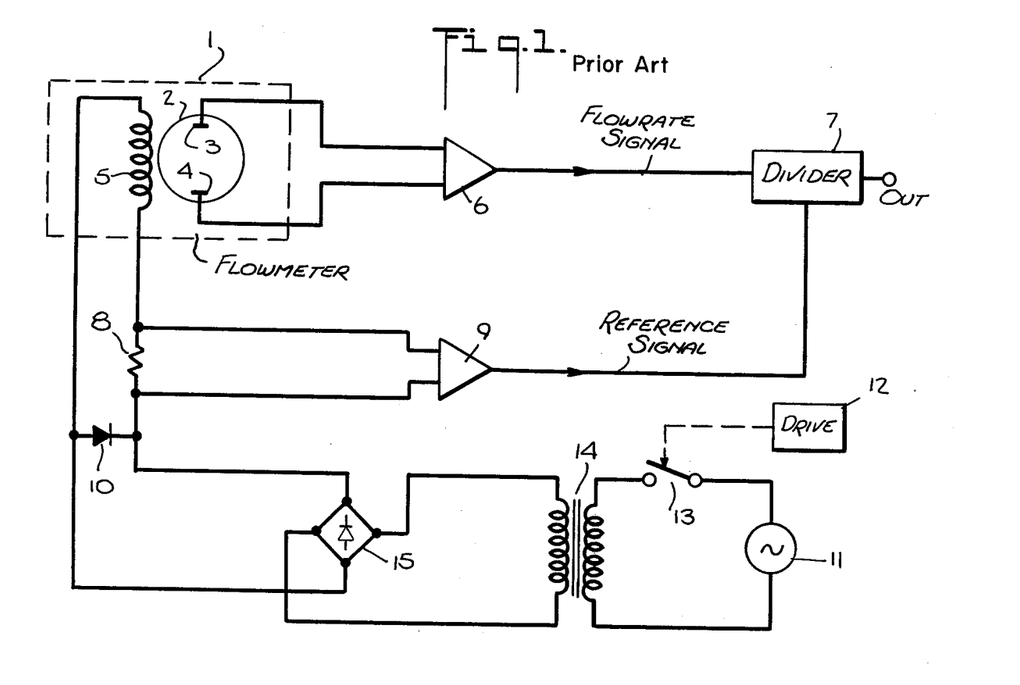
FIG. 1 is a schematic diagram of a magnetic flowmeter having a known type reference-voltage detecting circuit.

FIG. 1 schematically illustrates a conventional low-frequency excitation type of magnetic flowmeter system. The system includes a magnetic flowmeter 1 comprising a flow tube 2 through which liquid to be metered is conducted, a pair of electrodes 3 and 4 mounted at diametrically-opposed positions on tube 2, and an electromagnet having an excitation coil 5 serving to generate a magnetic field normal both to the tube's longitudinal flow axis and a transverse axis extending between electrodes 3 and 4.

When the fluid flowing through the tube intersects the magnetic field, a voltage proportional to the volumetric flow rate is induced in the fluid. The resultant flow signal detected by electrodes 3 and 4 is amplified by an amplifier 6. A divider 7 is provided to which is applied both the flow signal from amplifier 6 and a reference-voltage signal derived through an amplifier 9 from a resistor 8 connected in series with excitation coil 5.

A diode 10 shunted across the excitation current circuit functions to pass the current resulting from the counter electromotive force generated in excitation coil 5. A switch 13 is interposed between a commercial power line source 11 and the primary winding of a power transformer 14. This switch is "on-off" controlled by a low-frequency wave-generating circuit 12. The secondary winding of power transformer 14 is connected across the input junctions of a rectifier bridge 15 whose output junctions are connected across excitation coil 5 through resistor 8.

In this arrangement, divider 7 functions to divide the flow rate signal by the reference-voltage signal which is proportional to the excitation current, thereby eliminating from the output signal the unwanted influence of excitation current fluctuations.

Power transformer 14 serves to isolate the reference-voltage signal from commercial power line source 11. In general, the liquid to be metered is grounded; hence isolation between the flow signal detected by electrodes 3 and 4 and the reference-voltage developed across resistor 8 is necessary in order to avoid the closed circuit established by commercial power line source 11, resistor 8 and magnetic flowmeter 1.

In the conventional arrangement, the means for eliminating the d-c noise component generated in the electrical circuit is provided by divider 7, whereby the flow signals in the excitation state and the non-excitation state are sampled separately when the excitation current becomes stabilized, and the flow signal in the non-excitation state is subtracted from the flow signal in the excitation state. However, since these means are not important to an understanding of the features underlying the invention, a detailed explanation thereof will not be set forth herein.

The above-described conventional reference-voltage detection arrangement has several drawbacks, including the following:

(1) To isolate the excitation current circuit which includes reference voltage-detecting resistor 8 from the commercial power line source, a power transformer 14 having a large capacity is required. This requirement not only raises the cost of manufacturing a magnetic flowmeter, but it also makes it difficult to reduce the size of the flowmeter.

(2) Since a large amount of current flows through reference voltage-detecting resistor 8, this heavy current flow results in the generation of heat which gives rise to other problems.

(3) If one wishes to reduce the amount of the heat radiated from resistor 18, this can be done by making the resistance value thereof as small as possible. But this is disadvantageous; for it is very difficult to obtain a resistor having both a very small resistance value and a constant resistance characteristic. To solve this problem, one may employ a plurality of resistors connected in parallel with each other to produce a bank of resistors interposed in the excitation circuit. In this case, one creates another difficulty; for a bank of such resistors is bulky and more costly than a single resistor.

(4) Because of the small resistance value of resistor 8 and the low voltage produced thereacross, an amplifier 9 must be arranged before divider 7 so as to amplify the detected reference voltage signal.

(5) To overcome these drawbacks, one could conceivably employ a current transformer in place of resistor 8. But since the frequency of the excitation current flowing therein is very low, precise reference voltage-detecting by means of an ordinary small size current transformer becomes virtually impossible, and this dictates the use of a very large-size current transformer.

First Embodiment

Figure 2:
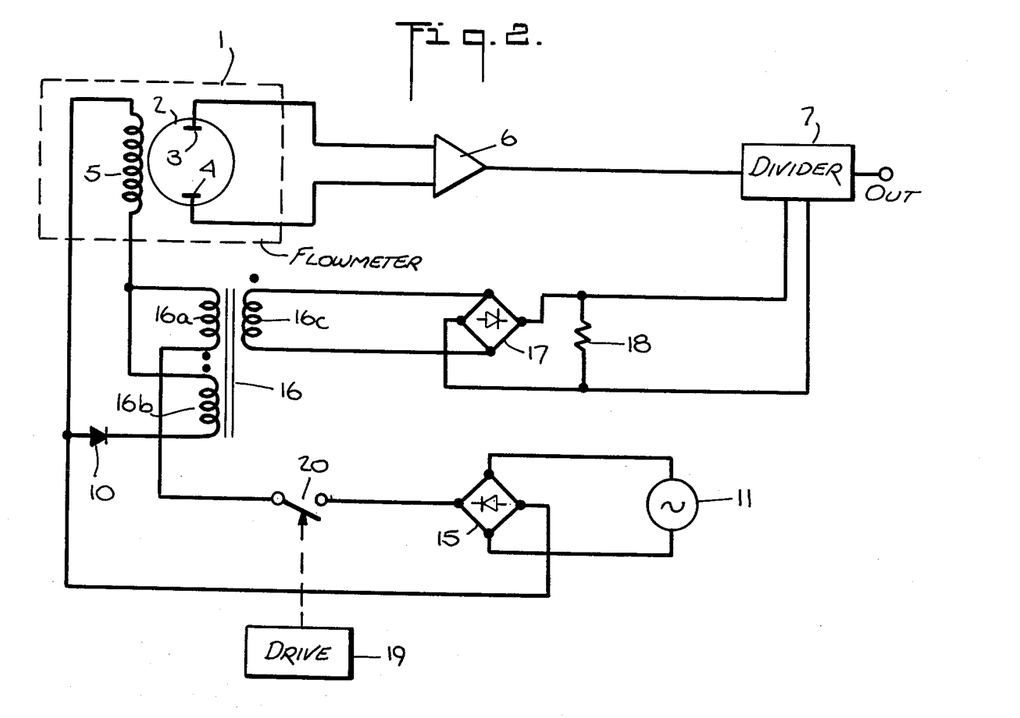
FIG. 2 is a schematic diagram of a first preferred embodiment of a magnetic flowmeter having a reference-voltage detecting circuit in accordance with the present invention.

Referring now to FIG. 2, there is shown a magnetic flowmeter which includes a reference voltage-detection circuit in accordance with the invention. In this figure, the same symbols as in FIG. 1 designate essentially identical components.

In this arrangement, commercial power line source 11 is directly connected to rectifying bridge 15. Between the output junctions of bridge 15, there is connected a first series circuit constituted by a switch 20, the first primary winding 16a of a current transformer 16, and excitation coil 5. A second series circuit is constituted by the second primary winding 16b of the transformer and a diode 10, this second series circuit being parallel to excitation coil 5.

The flow rate signal detected by electrodes 3 and 4 of the flowmeter is applied, after being amplified by amplifier 6, to divider 7. The secondary winding 16c of transformer 16 is connected to a full-wave rectifying bridge 17. A resistor 18 functioning as a load resistor is connected in parallel to the lines leading from the output junctions of rectifying bridge 17 to divider 7, whereby the voltage generated across the resistor is supplied to the divider as a reference voltage.

Figure 3:
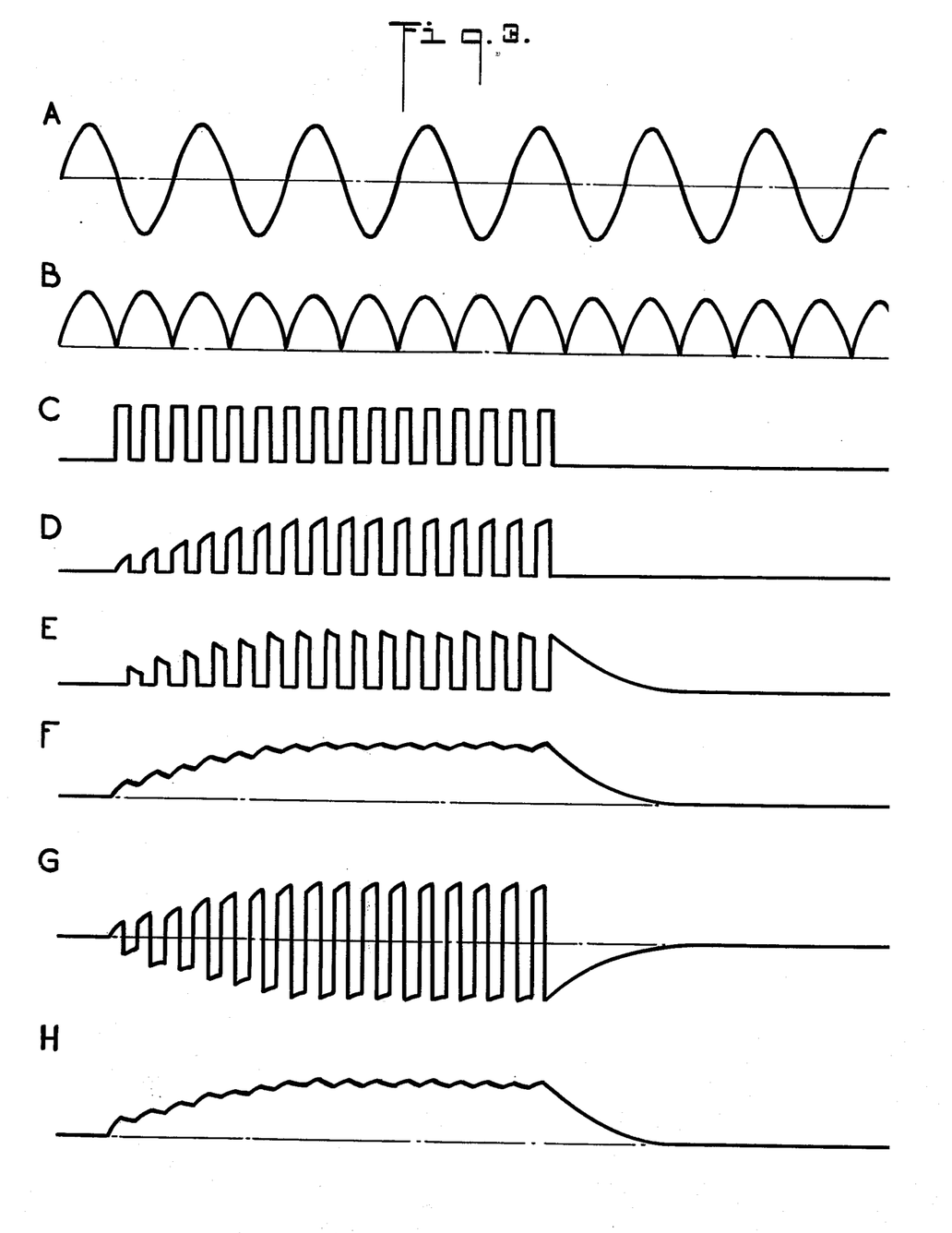
FIGS. 3A to H are waveforms illustrating the operation of the magnetic flowmeter shown in FIG. 2.

We will now explain in greater detail in connection with FIGS. 3A to H the operation of the first embodiment of the invention. FIG. 3A shows the sinusoidal waveform of the output of commercial power line source 11. This output is "full-wave" rectified by rectifier 15 to produce the waveform shown in FIG. 3B. FIG. 3C shows the "on-off" output of switch-driving circuit 19 which effects "on-off" control of switch 20 at a predetermined frequency higher than the commercial power line frequency. This switching operation is interrupted at a low frequency rate.

The output of rectifying bridge 15 is applied through switch 20 to excitation coil 5, whereby a current, as shown in FIG. 3D, flows therein. The same current flows in the first primary winding 16a which is connected in series with excitation coil 5. When switch 20 is in the "off" state, a counter electromotive force is generated in excitation coil 5, and a current resulting from the counter electromotive force is caused to flow through diode 10 in the second primary winding 16b, as shown in FIG. 3E. As a result, an excitation current, as shown in FIG. 3F, flows in excitation coil 5.

Since the first primary winding 16a and the second primary winding 16b are arranged so that the excitation current through the first winding 16a flows in the opposite direction to that of the current resulting from the counter electromotive force which flows through the second primary winding 16b, a reference signal, as shown in FIG. 3G, which includes an a-c component whose frequency is higher than that of the commercial power line frequency, is obtained from secondary winding 16c. This reference signal is "full-wave" rectified by rectifying bridge 17, whereby produced across load resistor 18 is a reference voltage, as shown by FIG. 3H, whose waveform is similar to that of the excitation current. Thus, a flow rate signal which is independent of fluctuations in the excitation current is obtained from divider 7 by dividing the output of amplifier 6 by the reference voltage generated across resistor 18.

Figures 4, 5:
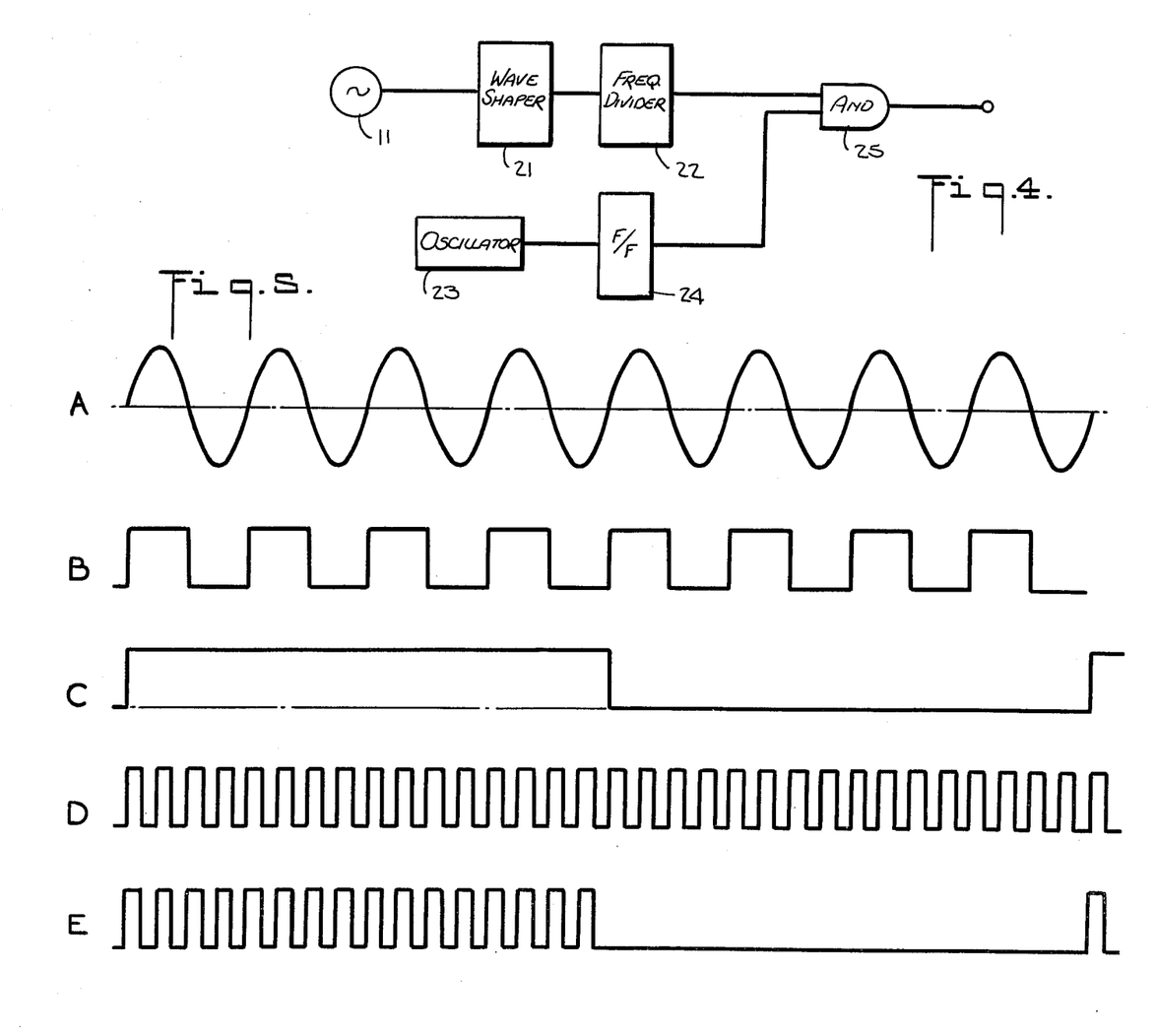
FIG. 4 is a schematic diagram of one example of switch driving circuits incorporated in the circuit shown in FIG. 2.

FIG. 4 shows a preferred example of a switch-driving circuit 19 to be incorporated in the magnetic flowmeter system shown in FIG. 2. The operation of this circuit will be explained in connection with FIGS. 5A to E. A wave-shaper circuit 21 serves to reshape the output of commercial power line source 11. FIG. 5A shows a waveform of the commercial power line, while FIG. 5B shows the shaped output of circuit 21. A frequency-dividing circuit 22 serves to divide the output frequency of circuit 21, as shown in FIG. 5C. A flip-flop 24 acts, as shown in FIG. 5D, to produce an output having a 50% on-off duty cycle from the output of an oscillator 23. An AND circuit 25 adapted to receive the respective outputs of frequency-divider 22 and flip-flop 24 generates the output shown in FIG. 5E.

In this arrangement, the reason why the low-frequency wave and the commercial power line from which the wave is derived are both in synchronism with each other, is that unwanted inductive noise from the commercial power line source can then be prevented. Further, the reason why the output of oscillator 23 is converted by means of flip-flop 24 into a signal whose duty cycle is 50% is that unwanted saturation of the transformer core resulting from the d-c component included in the excitation current can be prevented. The same amount of current as that flowing in the first primary winding 16a of transformer 16 when in the excitation or "on" state, flows in the second primary winding 16b when in the non-excitation state (i.e., switch 20 is "off"), so that the magnetic flux generated in each of these primary windings may be compensated for.

In an arrangement in accordance with the invention, currents whose frequency rates are relatively high flow in windings 16a and 16b, respectively, as shown in FIGS. 3D and 3E, while a low-frequency current flows in excitation coil 5. Among the features of this invention are the following:

(1) Since the frequency of the current which flows in the reference transformer is relatively high (i.e., 50 or 60 Hz), precise signal detection can be accomplished by means of a small-size current transformer.

(2) Since a reference voltage signal having a relatively large amplitude can be obtained, an amplifier, such as amplifier 9, necessarily provided in a conventional configuration, can now be omitted.

(3) Since isolation between the commercial power line source and the reference voltage is effected by reference transformer 16, the bulky power transformer heretofore necessary in a conventional arrangement as in FIG. 1 may be omitted, thereby reducing the total size of the circuit considerably.

(4) Since primary windings 16a and 16b of reference transformer 16 are arranged so that the excitation current flows through winding 16a, while a current depending on the counter electromotive force generated in the excitation coil flows in the opposite direction through winding 16b, a reference signal is obtained having the identical waveform to that of the excitation current actually flowing in the excitation coil. Hence saturation of the transformer core resulting from the d-c component included in the excitation current can be prevented, thereby eliminating distortion of the reference voltage signal.

Second Embodiment

Figure 6:
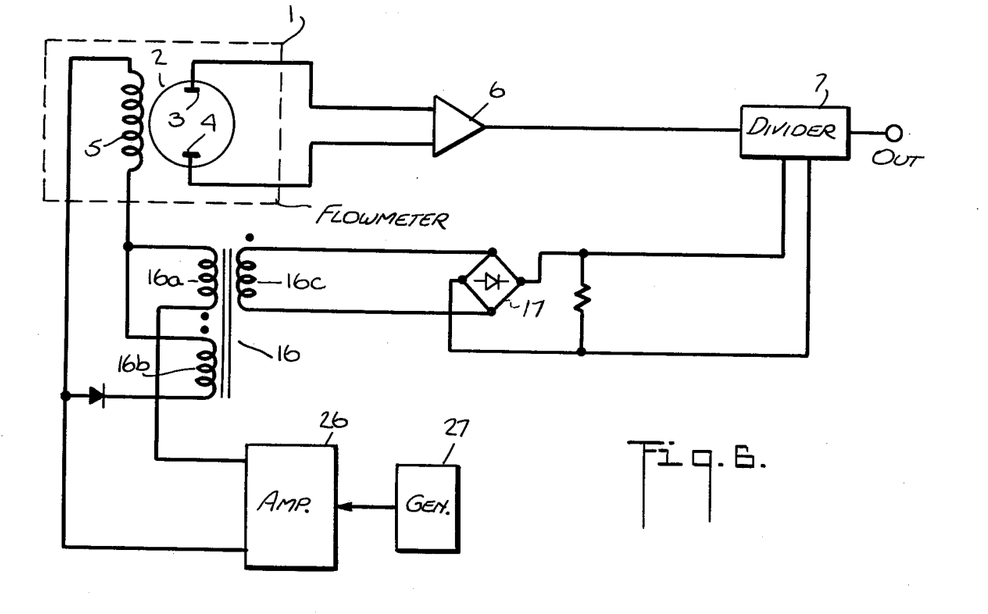
FIG. 6 is a schematic diagram illustrating a second preferred embodiment of the invention.

FIG. 6 shows the second preferred embodiment in accordance with this invention. In the first embodiment of the invention, the low-frequency excitation current is produced by chopping the current supplied from commercial power line source 11 by means of switch 20. In this second embodiment, an a-c power source constituted by a signal generator 27 and a power amplifier 26 is used in place of line source 11. That is, signal generator 27 is controlled to produce a signal whose form is shown in FIG. 3C. The output of generator 27, after being amplified by power amplifier 26, is applied to excitation coil 5.

Figure 7:
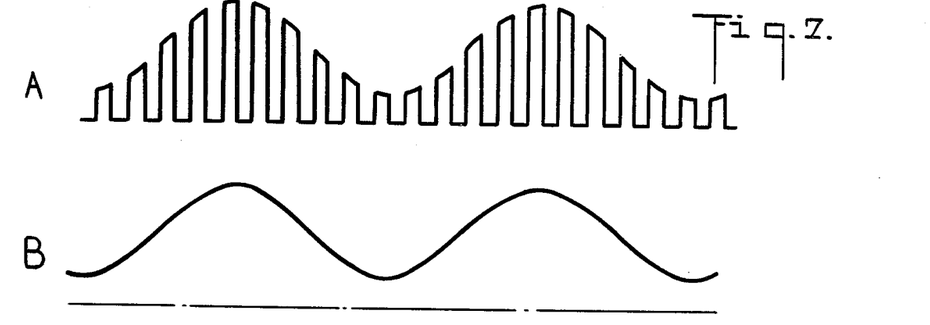
FIGS. 7A and 7B are waveforms illustrating the operation of the magnetic flowmeter shown in FIG. 6.

In the same arrangement, it is also possible to obtain an excitation current whose form is shown in FIG. 7B, by applying to excitation coil 5 a high-frequency a-c voltage that is modulated by a low-frequency sinusoidal wave as shown by FIG. 7A.

Third Embodiment

Figure 8:
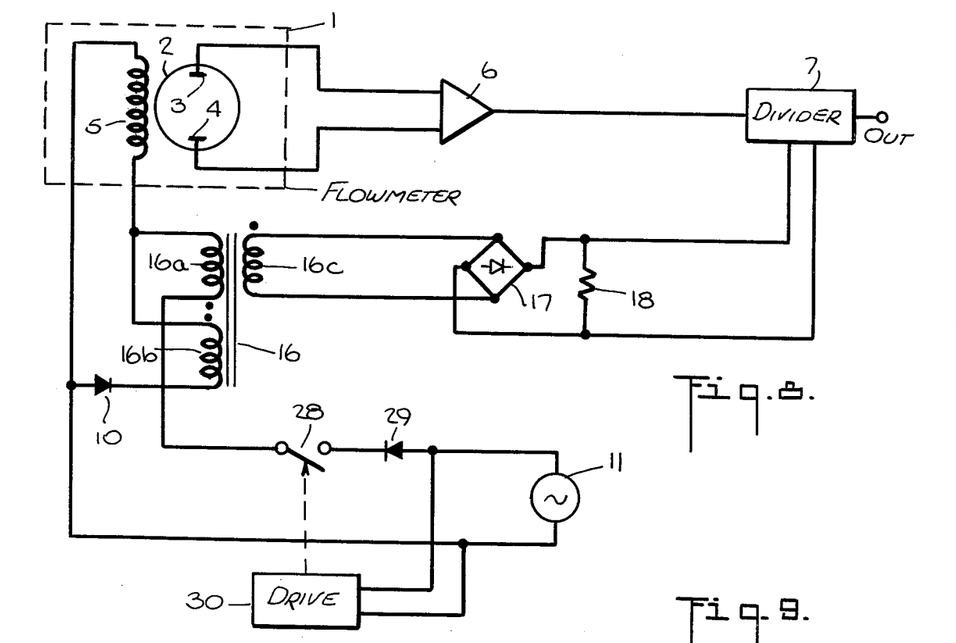
FIG. 8 is a schematic diagram of the third embodiment of the invention.
Figure 9:
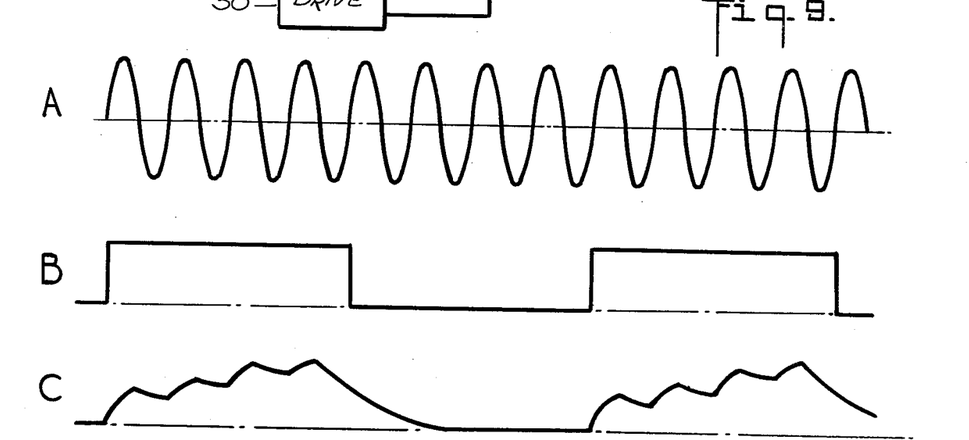
FIGS. 9A to C are waveforms illustrating the operation of the magnetic flowmeter shown in FIG. 8.

FIG. 8 shows the third embodiment of the invention in which a series circuit constituted by a switch 28 and a diode 29 is interposed between commercial power line source 11 and primary winding 16a of reference transformer 16. A switch-driving circuit 30 serves to produce an on-off control signal, as shown by FIG. 9B, whose on-off frequency rate is a sub-multiple of the commercial power line frequency shown in FIG. 9A. As a result, an excitation current, as shown in FIG. 9C, is caused to flow through excitation coil 5.

Fourth Embodiment

Figure 10:
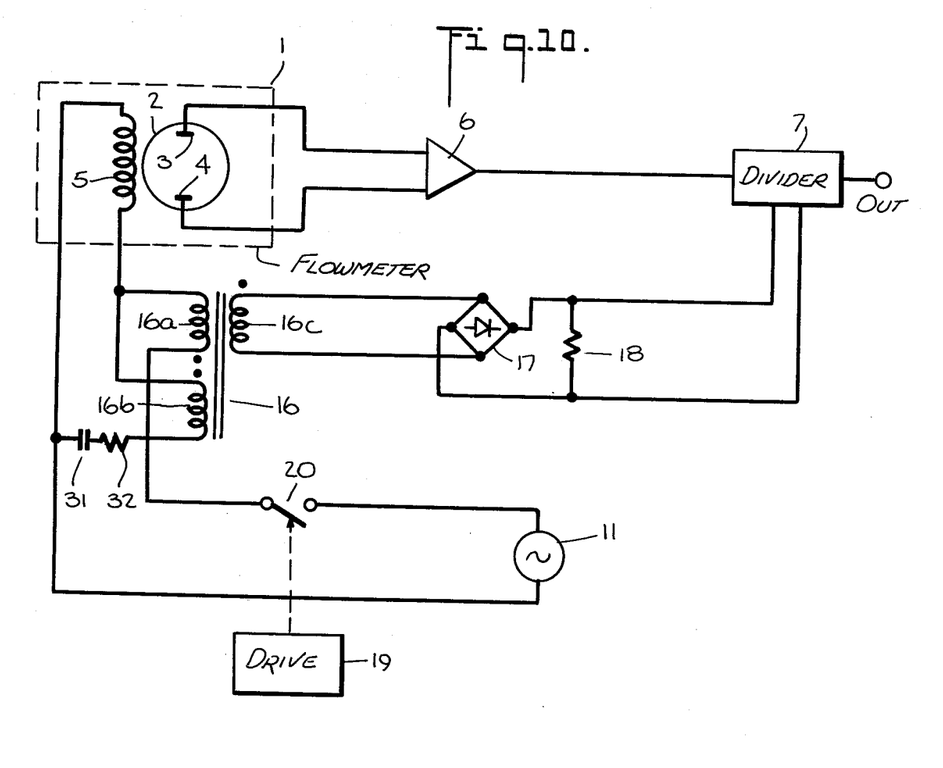
FIG. 10 is a schematic diagram of a fourth embodiment of the invention.

FIG. 10 shows the fourth embodiment of the invention in which a series circuit constituted by a capacitor 31 and a resistor 32 is employed across the excitation current circuit in place of the diode 10 provided in the previous embodiments.

Figure 11:
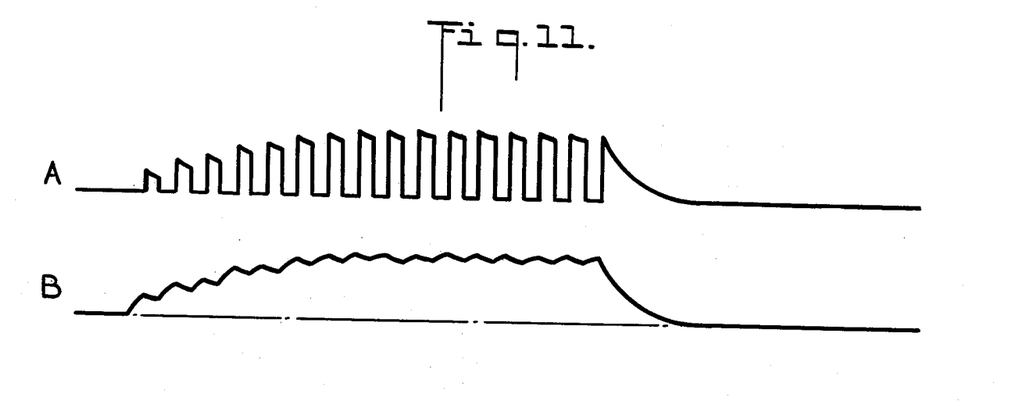
FIGS. 11A and 11B are waveforms illustrating the operation of the magnetic flowmeter shown in FIG. 10.

As shown in FIG. 11A, in this arrangement the current flowing through primary winding 16b of reference transformer 16 quickly attenuates; hence the excitation current in the non-excitation period becomes zero, as shown in FIG. 11B, sooner than in the previous arrangements which make use of diode 10.

Fifth Embodiment

Figure 12:
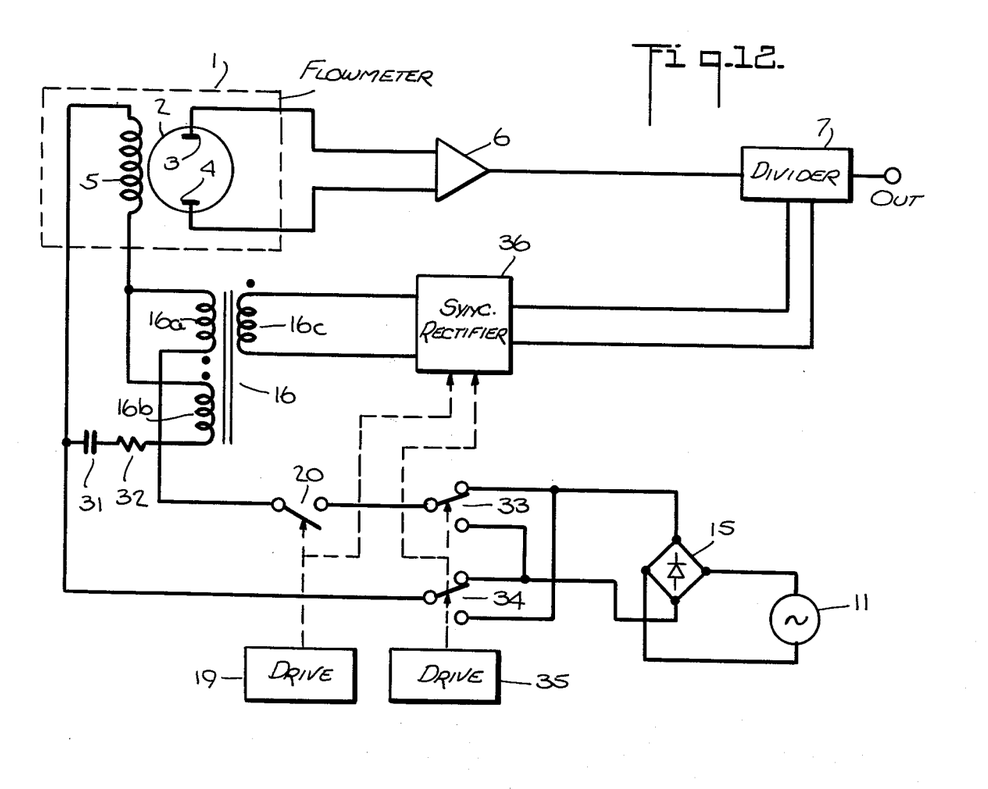
FIG. 12 is a schematic diagram of a fifth embodiment of the invention.

FIG. 12 shows the fifth embodiment of the invention in which a pair of polarity-inverting switches 33 and 34 is provided between rectifying bridge 15 and the excitation current circuit. These switches are controlled by the output of a drive signal generating circuit 35. To a synchronous rectifier 36 arranged between reference transformer 16 and divider 7, the outputs of switch-driving circuit 19 and drive signal generating circuit 35 are applied as the control signal therefor.

Figure 13:
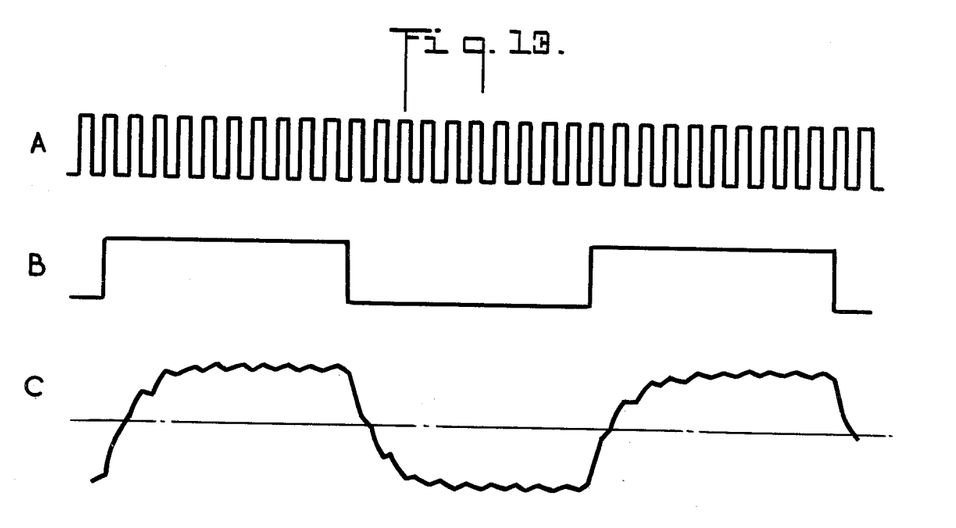
FIGS. 13A to C are waveforms illustrating the operation of the magnetic flowmeter shown in FIG. 12.

We will now explain in greater detail in connection with FIGS. 13A to 13D the operation of this circuit. Switch 20 is "on-off" controlled, as shown in FIG. 13A, at a predetermined rate which is higher than the frequency of the commercial power line source. Switches 33 and 34 are inverted at a low-frequency rate, as shown in FIG. 13B, whereby the polarity of the excitation current is inverted at that low-frequency rate and an excitation current, such as shown in FIG. 13C, flows through the excitation coil. Furthermore, if switches 33 and 34 are controlled, as shown in FIG. 14A, an excitation current, such as shown in FIG. 14B, can then be obtained.

Sixth Embodiment

Figure 15:
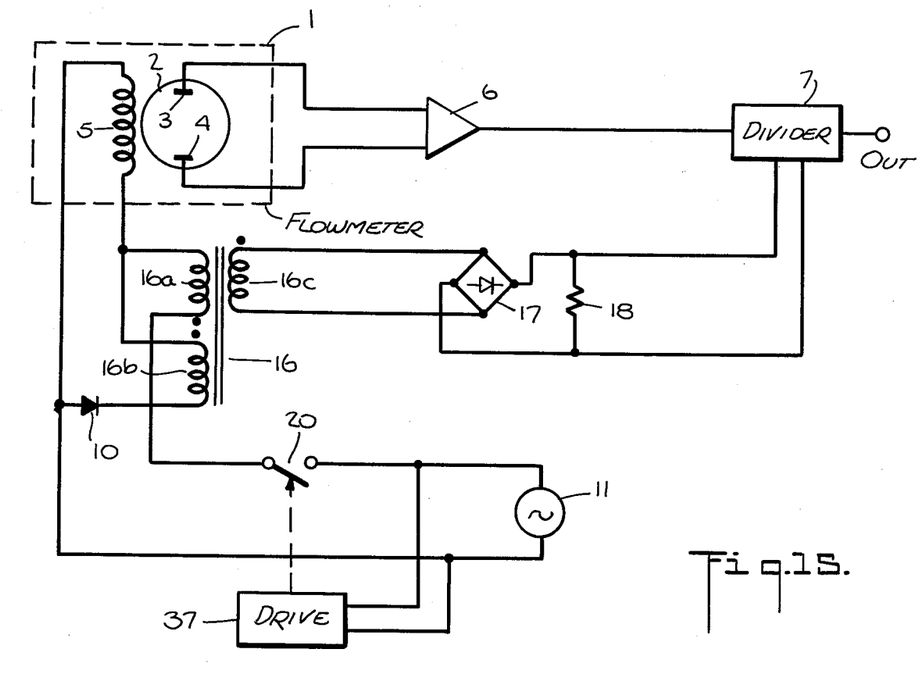
FIG. 15 is a schematic diagram of a sixth embodiment of the invention.

FIG. 15 shows the sixth embodiment of the invention in which a switch drive circuit 37 is provided that functions to provide a switching signal causing switch 20 to be in the "on" state in coincidence with the positive half cycle of the commercial power line source and to interrupt this switching operation at a low-frequency rate whose frequency is less than the commercial power line source. By means of this arrangement, it becomes possible to omit the rectifying bridge 15 necessarily provided in the previous embodiments.

Figure 14:
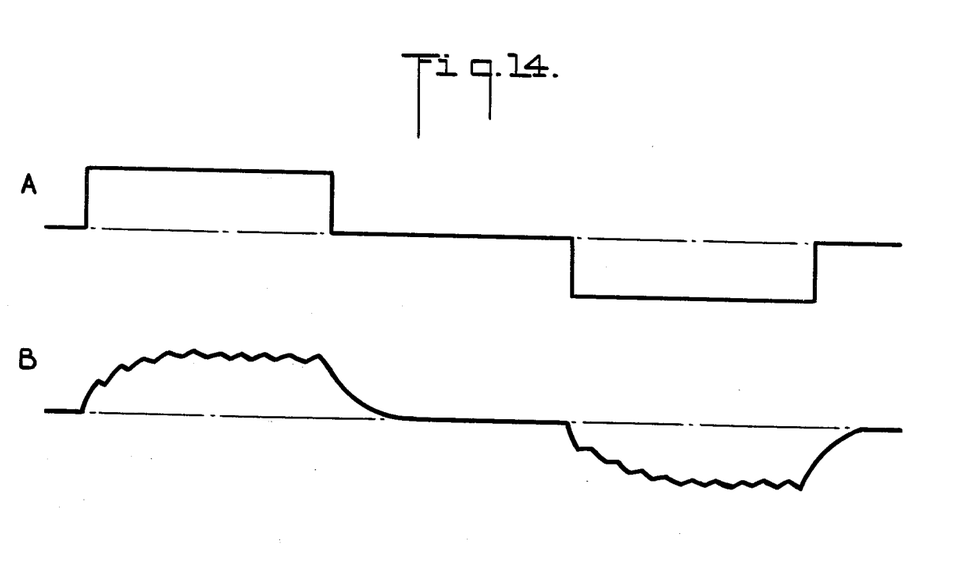
FIGS. 14A and 14B are waveforms illustrating the operation of the magnetic flowmeter shown in FIG. 12, when its excitation coil is energized in a different manner.

This technique may readily be utilized in a magnetic flowmeter system whose excitation coil is energized in a manner such as that shown in FIG. 13C or in FIG. 14B.

Seventh Embodiment

Figure 16:
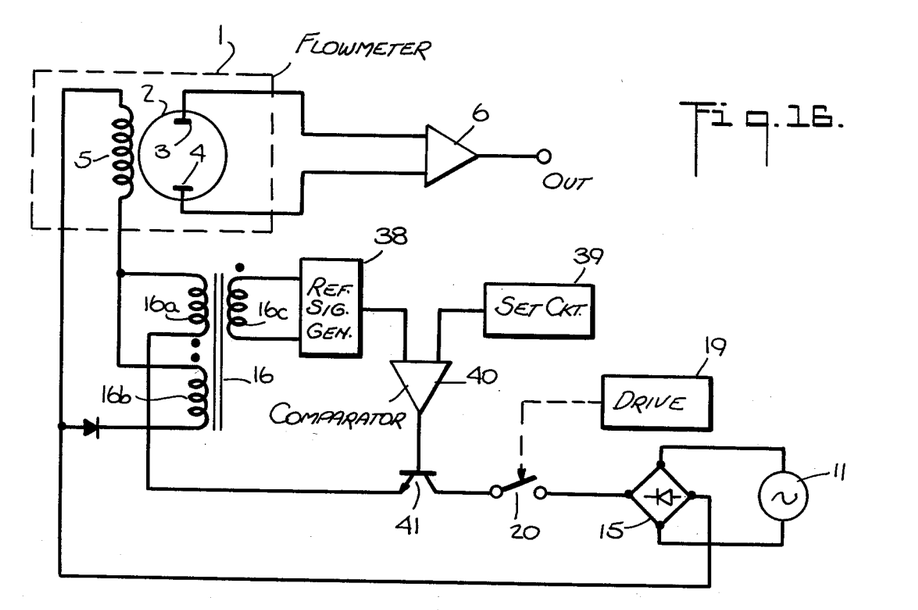
FIG. 16 is a schematic diagram of a seventh embodiment of the invention.

FIG. 16 shows the seventh embodiment of the invention in which a transistor 41 serving to regulate the excitation current to maintain a predetermined level is interposed between switch 20 and the first primary winding 16a of reference transformer 16.

The output of a circuit 38 generating a signal proportional to the reference-voltage a-c signal derived from secondary winding 16C of reference transformer 16 is applied to one of input terminals of a comparator 40. The other input of this comparator is connected to a reference voltage-setting circuit 39. With this arrangement, the excitation current is kept constant.

Eighth Embodiment

Figure 17:
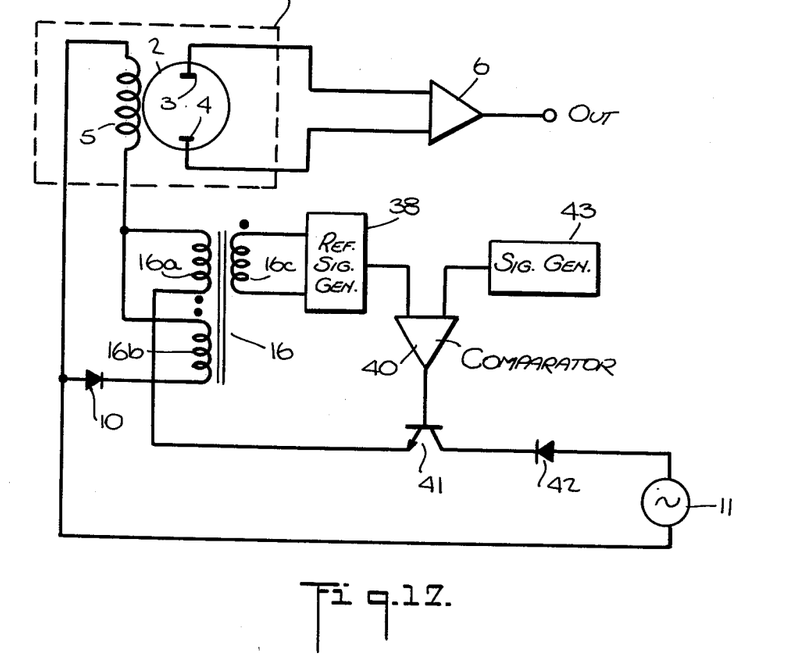
FIG. 17 is a schematic diagram of an eighth embodiment of the invention.
Figure 18:
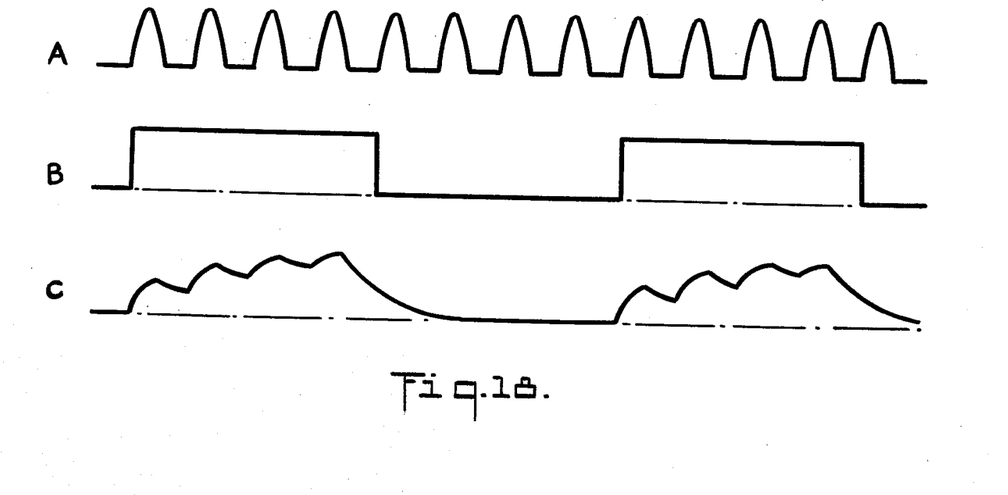
FIGS. 18A to C are waveforms illustrating the operation of the magnetic flowmeter shown in FIG. 17.

FIG. 17 shows the eighth embodiment of the invention in which a diode 42 is interposed between commercial power line source 11 and current-controlling transistor 41, thereby rectifying the output of commercial power line source 11, as shown in FIG. 18A.

A signal generator 43 which is connected to one of the inputs of comparator 40 generates a reference signal, such as shown in FIG. 18B. As a result, an excitation current such as that shown in FIG. 18C, can be obtained. As explained previously, in an arrangement in accordance with this invention, a reference voltage having a waveform identical to that of the excitation current can be obtained, without distortion, by use of the small-size current transformer.

While the invention has been explained especially in connection with a low-frequency type of magnetic flowmeter, it may also be used in a d-c excitation type of magnetic flowmeter in which a constant direct current is obtained by applying continuously a voltage signal such as shown in FIG. 13A or 18A to the excitation coil.

While there have been shown and described preferred embodiments of a magnetic flowmeter in accordance with the invention, it will be appreciated that many changes and modifications may be made therein without, however, departing from the essential spirit thereof.

I claim:

1. In a magnetic flowmeter provided with a flow tube through which the fluid to be metered is conducted to intercept a magnetic field established by an electromagnet having an excitation coil, thereby inducing a signal depending on flow rate in a pair of electrodes mounted at diametrically-opposed positions in said tube, the combination comprising:

A a current supply network to supply to said coil a low-frequency excitation current derived from a commercial power line source having a predetermined frequency, said excitation current having a waveform created by a current that is interrupted at an on-off rate that is higher than said predetermined frequency to produce an on-off current that is modulated by a low-frequency wave;

B means producing a reference voltage, said means including a current transformer having a pair of primary windings and a secondary winding, one of said primary windings being interposed between said current supply network and said coil, whereby said excitation current flows therethrough, said other primary winding being so connected whereby a current resulting from the counter electromotive force generated in said coil flows therethrough in a direction opposed to the flow of current in said first primary winding whereby a reference-voltage a-c signal is yielded by said secondary winding from which said reference voltage is derived; and C means responsive to said reference voltage and coupled to said electrodes to produce an output signal in which the influence of fluctuations in said excitation current on said flow rate signal is eliminated.

2. The combination as set forth in claim 1, wherein said last-named means is constituted by a divider to which said flow rate signal and said reference voltage are applied.

3. The combination as set forth in claim 2, wherein said reference voltage is derived from said secondary winding by means of a rectifier bridge whose input junctions are connected to said secondary winding and whose output junctions are connected to said divider.

4. A combination as set forth in claim 3, further including a load resistor connected across the output junctions.

5. The combination as set forth in claim 2, further including an amplifier interposed between said electrodes and said divider.

6. The combination as set forth in claim 1, wherein said current supply network is constituted by a full-wave rectifier bridge whose input junctions are connected to said commercial power line and whose output junctions are connected to said coil through a switch which is actuated at said low-frequency rate.

7. The combination as set forth in claim 1, further including a diode interposed between the other of said primary windings and said excitation coil.

* * * * *